United States Patent [19]

Boomgarden et al.

[11] 4,168,091
[45] Sep. 18, 1979

[54] ONE-PIECE COUPLING CONNECTOR FOR TUBING

[76] Inventors: Lee N. Boomgarden, 707 S. Jefferson, Wellsburg, Iowa 50680; Harold B. Tendall, 3706 Harrison, Rockford, Ill. 61108

[21] Appl. No.: 897,574

[22] Filed: Apr. 19, 1978

[51] Int. Cl.² ............................................. F16L 21/06
[52] U.S. Cl. ................................. 285/419; 285/423; 285/DIG. 4
[58] Field of Search ............... 285/DIG. 4, 373, 419, 285/423, 293; 24/16 PB

[56] References Cited

U.S. PATENT DOCUMENTS

| | | | |
|---|---|---|---|
| 3,229,998 | 1/1966 | Pennington | 285/419 |
| 3,633,947 | 1/1972 | Nelson | 285/423 X |
| 3,711,632 | 1/1973 | Ghirordi | 285/DIG. 4 |
| 4,084,844 | 4/1978 | Abner | 285/DIG. 4 |

FOREIGN PATENT DOCUMENTS

| | | | |
|---|---|---|---|
| 696775 | 10/1964 | Canada | 285/419 |
| 1236294 | 6/1971 | United Kingdom | 285/423 |

Primary Examiner—Dave W. Arola
Attorney, Agent, or Firm—Rudolph L. Lowell; G. Brian Pingel

[57] ABSTRACT

A coupling connector that is concentrically engageable about the adjacent ends of two corrugated tubes and includes a bendable strap member having at least one slot at one end thereof and a pawl at an opposite end and wherein the slot is formed with an enlarged end portion. Ratchet teeth are disposed on the interior surface of the strap member along each side of the slot so that engagement of the pawl and ratchet teeth, to secure the connector about the adjacent tube ends, occurs upon insertion of the pawl through the enlarged end portion of the slot.

6 Claims, 6 Drawing Figures

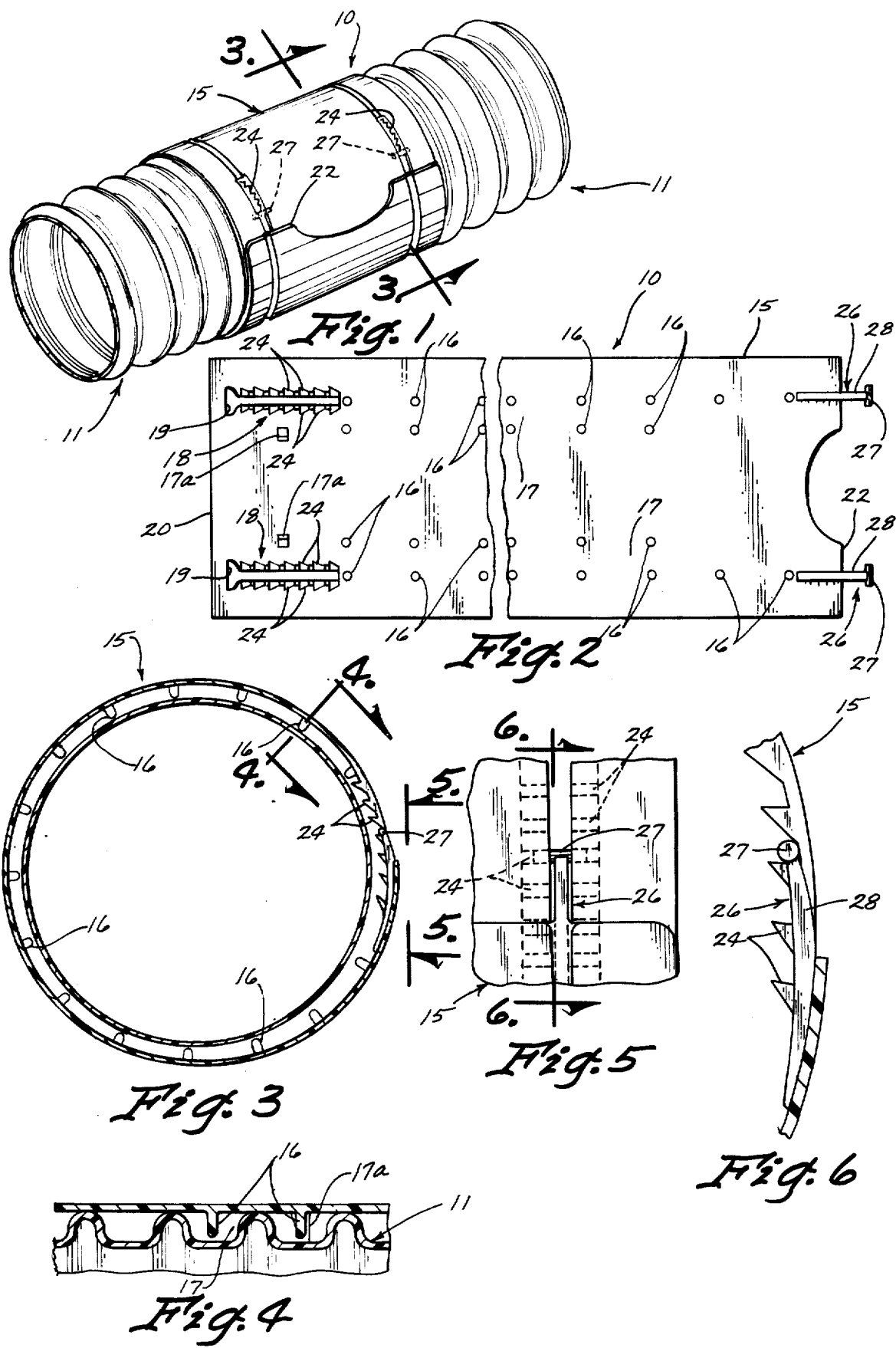

ONE-PIECE COUPLING CONNECTOR FOR TUBING

BACKGROUND OF THE INVENTION

1. Field of the Inventor

The present invention relates in general to connectors for tubing sections and more specifically relates to such connectors that can be varied in diameter to accommodate tubing of varying diameters.

2. Description of the Prior Art

A wide variety of connectors is known in the art for serving as a connecting joint between the ends of two pieces of tubing. One such connector is disclosed in a U.S. Pat. No. 3,229,998 to Pennington and includes two semi-circular segments that can be joined to one another to form a circular configuration. The connector segments have overlapping ends with interengaging teeth. A pair of fork prongs extend from each segment to engage the prongs of the other segment, thereby exerting a compressive force on the two segments to maintain the segment teeth in engagement.

Although the Pennington connector may well have satisfied the particular need Pennington was faced with, such connector appears to have several drawbacks for general use. Firstly, the two segment Pennington configuration is undesirable for connecting the adjacent ends of two sections of tubing because it is difficult to hold both tubing ends in proper position while at the same time attempting to fasten a pair of connector segments together. Secondly, the fork prongs of the connector segments are offset outwardly from the body of the connector, and are, thus, in a condition of high exposure for possible damage or disengagement. Thirdly, the Pennington connector is not adapted to be used with various diameters of tubing and instead must be specially sized for each section of tubing with which it is to be used. Additionally, the connector of Pennington does not readily lend itself for shipping and storage purposes.

SUMMARY OF THE INVENTION

The present invention provides a durable one-piece connector for a wide range of various diameter tubing and is adapted to concentrically fit about the adjacent ends of two sections of tubing to serve as a joint therebetween. The connector includes a bendable strap member having a longitudinally extended slot near a first end, ratchet means formed on the interior surface of the strap member along each side of the slot, and pawl means extended from a second end of the strap member for insertion through the slot and engagement with the ratchet means to securely fasten the connector about the tube ends.

The connector is particularly advantageous for use with corrugated tubing and may include a plurality of spaced apart retention pins that protrude between the ridges of corrugated tubing held in the connector and thereby block removal of the tubes. Preferably, the connector includes at least two slots and associated pawl means that extend longitudinally at the sides of the connector so that the connector may be tightly mounted about the adjacent ends of the tubing being connected together.

DESCRIPTION OF THE DRAWINGS

FIG. 1 is a side perspective view of a coupling connector of the present invention shown in connected assembly relation with a pair of corrugated tubes;

FIG. 2 is an enlarged developed view of the interior surface of the connector of FIG. 1;

FIG. 3 is an enlarged cross sectional view taken along line 3—3 of FIG. 1;

FIG. 4 is an enlarged fragmentary sectional view taken along line 4—4 of FIG. 3;

FIG. 5 is an enlarged fragmentary view taken along line 5—5 of FIG. 3; and

FIG. 6 is an enlarged fragmentary view taken along line 6—6 of FIG. 5.

DESCRIPTION OF THE PREFERRED EMBODIMENT

A preferred embodiment of the coupling connector of the present invention is shown in FIG. 1 at 10 in a concentric assembly relation with the adjacent ends of two corrugated tubes 11 having exterior annular corrugations or ridges 12. Although the connector 10 is described herein solely in connection with the corrugated tubes 11, the connector 10 may be advantageously employed with other types of tubing. The connector 10 includes a flat bendable strap member 15 that is preferably of a sufficient width dimension to overlie several of the corrugations 12 at the ends of the tubes 11, and has a longitudinal dimension greater than the circumference of the largest tubing with which it is to be used. The strap member 15 is perferably molded of a material such as nylon, polypropylene, polyethylene or the like and although the member 15 is bendable, it should be resilient and relatively stiff.

As shown in FIG. 2, the interior surface of the strap member 15 has a plurality of rows of longitudinally extended and transversely aligned, spaced apart retention pins 16 that define longitudinal channels 17 near the lengthwise side edges of the member 15 for loosely receiving therein certain of the ridges of the corrugated tubes 11 as indicated in FIG. 4. Thus, when the member 15 is wrapped about the tubes 11, the pins 16 serve as abutment means to prevent the tubes 11 from being longitudinally removed from the connector 10. In addition to the pins 16, the connector 10 also has a pair of upstanding lugs 17a approximately twice the height of the nibs 16, as indicated by FIG. 4, to engage the outer surface of the tubing 11. When the connector 10 is employed with tubing having threaded ends, the lugs 17a prevent such tubing from being unthreaded from the connector.

Referring again to FIG. 2, a pair of transversely spaced longitudinally extended slots 18 are formed in the member 15 adjacent the end 20 of the member 15. Each slot 18 has an enlarged head or end portion 19 adjacent the end 20 of the strap member 15. Each slot 18 is bordered along opposite sides thereof by a series of ratchet teeth 24 formed on the interior side of the strap member 15. Extended from an opposite end 22 of the strap member 15 are a pair of tongues or pawls 26 corresponding to and longitudinally aligned with the slots 18.

Each pawl 26 is integrally formed with the strap member and includes an arm 28 of a transverse dimension less than the width of a slot connected at one end to the strap member and having at its free end a cross member 27 of a cylindrical shape 21. The cross member 27 is of a size to fit through the enlarged slot portion 19, but is of a length greater than the width of the slot 21. When the strap member 15 is wrapped around the adjacent ends of the tubes 11, the ends 20 and 22 of the member 15 are connected together by positioning the pawl cross members 27 through the enlarged slot portions 25 for engagement with selected ones of the ratchet teeth 24.

It should be noted that to engage the pawls 26 with the ratchet teeth 24, the strap member end 22 must overlap the end 20 so that the pawls 26 can be inserted through the enlarged slot portions 19 from the exterior surface of the member 15, as shown in FIG. 6. The strap member 15 may be molded in a developed condition such as shown in FIG. 2, but it is preferable to mold it with slightly arcuate shape to facilitate shipping and storage of the connectors in a minimum of space while retaining ease of assembly with tube sections to be connected. Thus, to overlap the ends 20 and 22, compressive force will be applied on the member 15 to urge the ends 20 and 22 together in an overlapping relation. Upon engagement of the pawls 26 and ratchet teeth 24 and removal of such compressive force, the resilient member 15 attempts to return to its normal slightly arcuate shape thereby holding the pawls 26 in tight engagement with the teeth 24.

The engagement of the pawls 26 and the ratchet teeth 24 provides a positive connection between the ends 20 and 22 of the strap member 15.

Preferably, the ratchet teeth 24 are slanted away from the enlarged slot portion 19. Movement of the pawls 26 in the direction away from the enlarged portions 19 is assisted by the slant of the teeth 24 whereas movement of the pawls toward the enlarged portions 19 is resisted by such inclination of the teeth. In fact, when the connector 10 is fitted tightly about the tube sections 11, movement of the pawls 24 toward the enlarged slot portions 19 is practically impossible without damaging the connector 10. Thus, the present invention provides a one-piece coupling connector for rigidly connecting together adjacent ends of corrugated tube sections with relation ease.

Although the invention has been described with respect to a preferred embodiment thereof, it is to be understood that it is not to be so limited since changes and modifications can be made therein which are within the full intended scope of this invention as defined by the appended claims.

We claim:

1. A One-piece coupling unit for connecting together adjacent ends of a pair of tube sections comprising:
(a) a bendable strap member having inner and outer surfaces coextensive therewith and of a width sufficient to axially overlap said tube ends, including:
   (1) a slot extending between said inner and outer surfaces on one end of said strap member, at least a pair of transversely spaced apart ratchet means formed on one of said surfaces adjacent said one end of said strap with said slot therebetween; and
   (2) elongated pawl means having a ratchet means engagement member, said pawl means extended outwardly from an opposite end of said strap and insertable through said slot for engagement of said ratchet means engagement member with said pair of ratchet means when the strap member is concentrically mounted about the ends of said tube sections.

2. A one-piece coupling unit according to claim 1 wherein said strap member is formed with:
(a) a plurality of said slots and a plurality of said pairs of ratchet means, said slots being spaced transversely of the strap member and each having an associated pawl means.

3. A one-piece coupling unit for connecting together adjacent ends of a pair of tube sections comprising:
(a) a bendable strap member having inner and outer surfaces, a width sufficient to axially overlap said tube ends and a first end formed with at least one longitudinally extended slot directed toward a second end thereof, said strap member further including:
   (1) ratchet means formed on the inner surface of said strap member along each side of said slot; and
   (2) elongated pawl means having a free end with a ratchet means engagement member, said pawl means extended outwardly from the second end of said strap and insertable through said slot in the strap member for engagement of said ratchet means engagement member with said ratchet means when the strap member is concentrically mounted about the adjacent ends of said tube sections.

4. A one-piece coupling unit according to claim 3 wherein said strap member is formed with:
(a) a plurality of said slots spaced transversely of the strap member each having an associated ratchet means and an associated pawl means.

5. A one-piece coupling unit according to claim 3 wherein:
(a) said strap member is formed from a stiff, resilient material.

6. A one-piece coupling unit according to claim 3 wherein said tube sections are corrugated and said strap member includes:
(a) abutments means protruding from the interior surface thereof for engaging the corrugations of said tube sections to limit relative axial movement therebetween.

* * * * *